Feb. 13, 1934.  W. J. WARD ET AL  1,947,142
INSPECTION APPARATUS
Filed Aug. 22, 1933  5 Sheets-Sheet 3

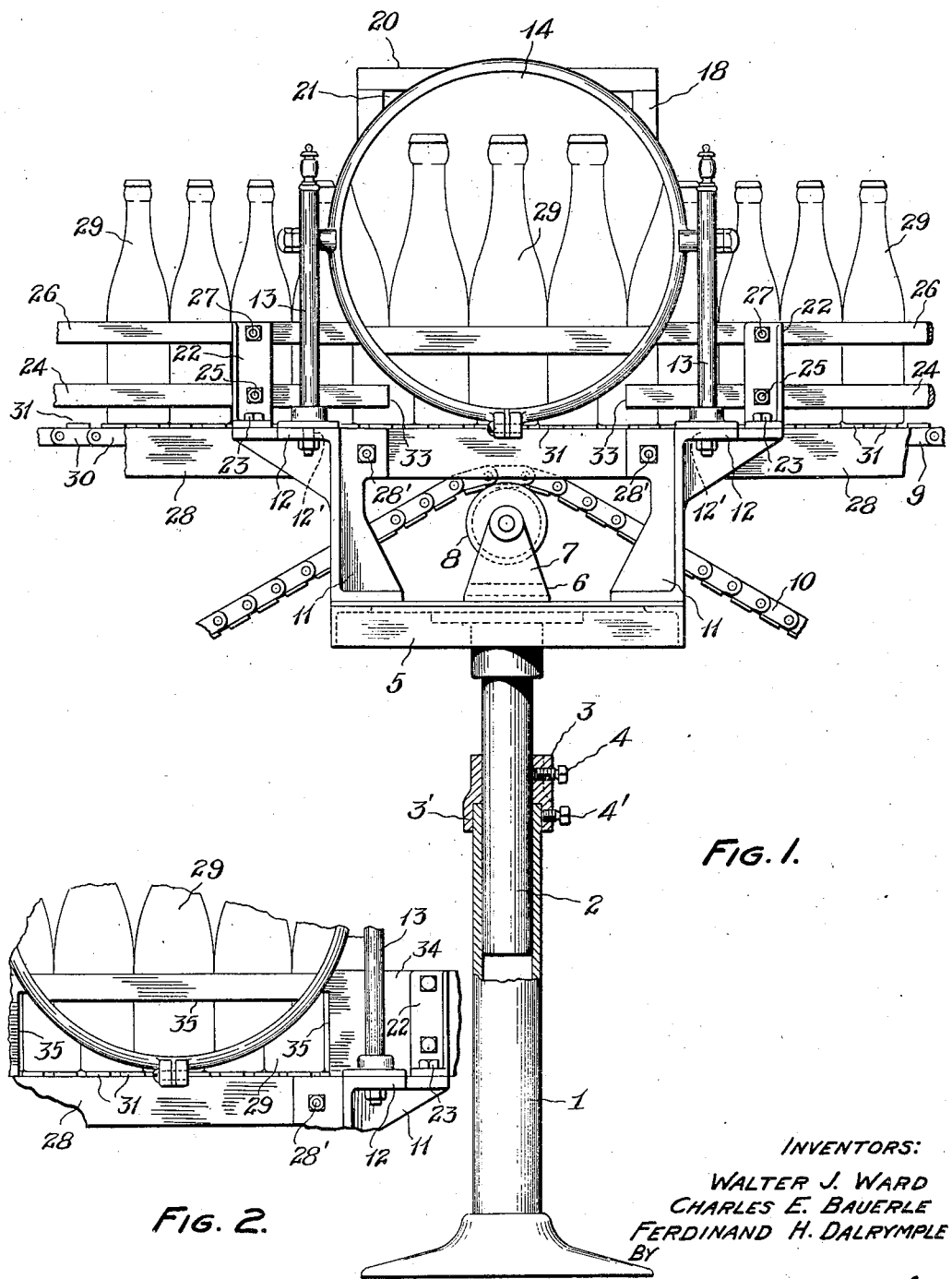

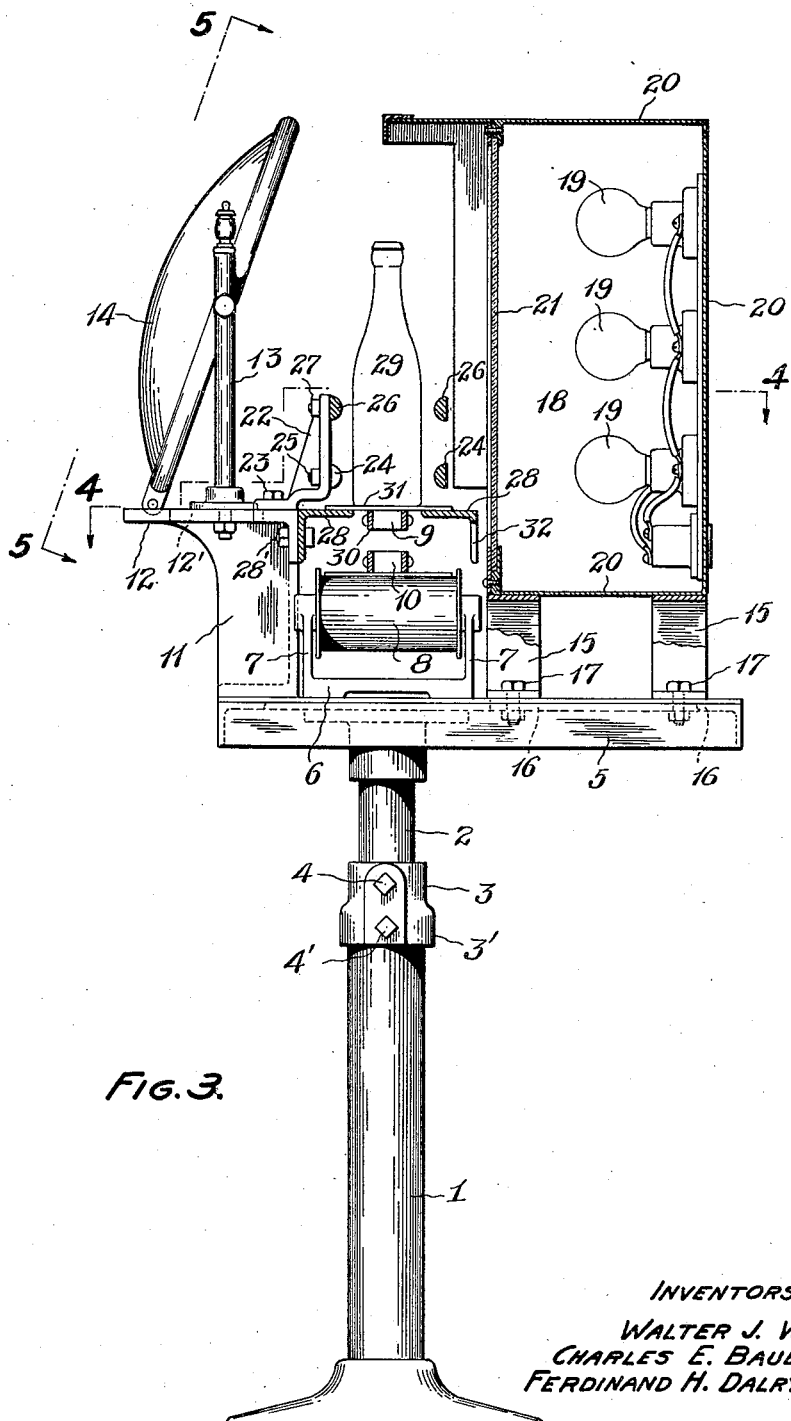

INVENTORS:
WALTER J. WARD
CHARLES E. BAUERLE
FERDINAND H. DALRYMPLE
BY
Saywell and Wesseler
ATTORNEYS Feb. 13, 1934.     W. J. WARD ET AL     1,947,142
INSPECTION APPARATUS
Filed Aug. 22, 1933     5 Sheets-Sheet 4
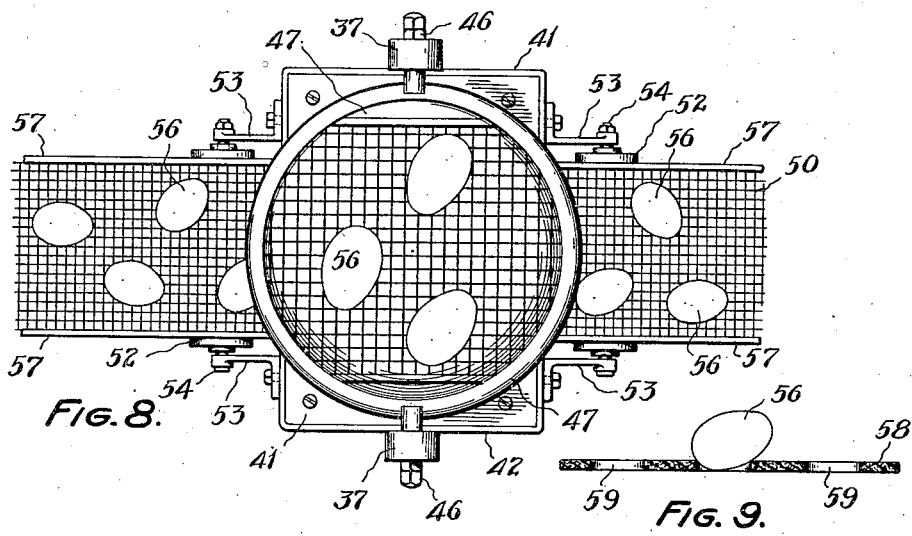
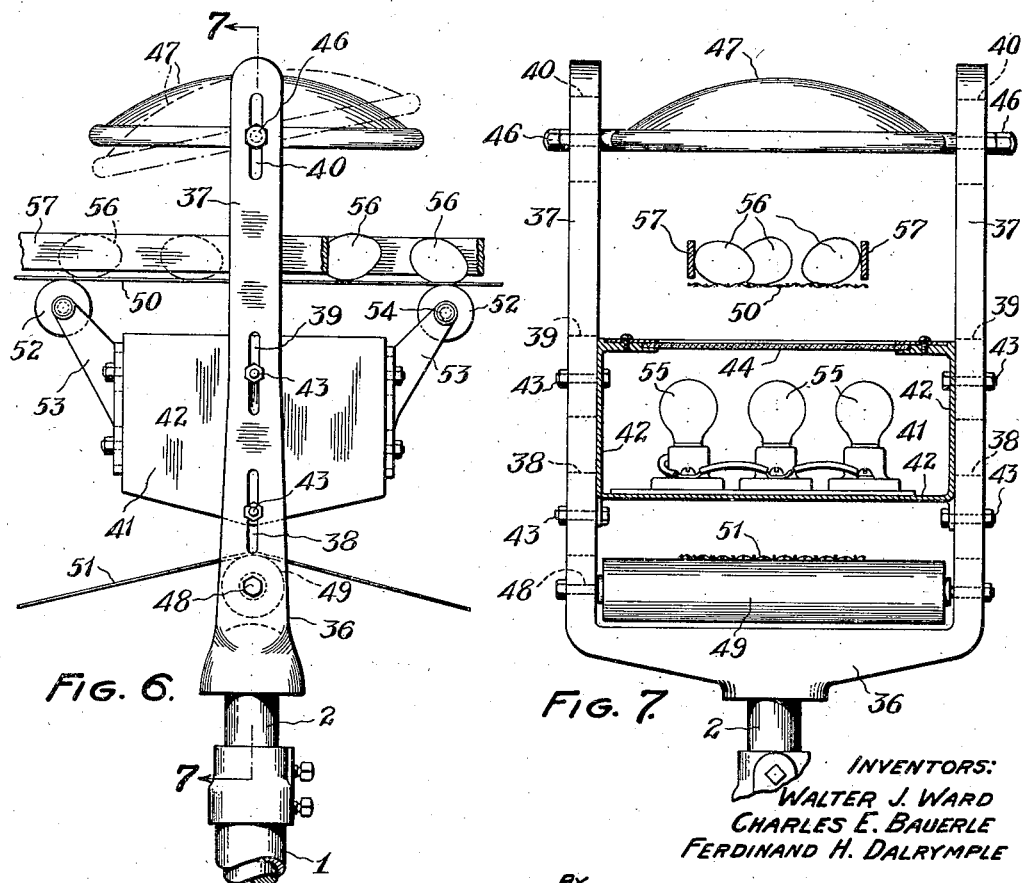
INVENTORS:
WALTER J. WARD
CHARLES E. BAUERLE
FERDINAND H. DALRYMPLE
BY Saywell and Wesseler
ATTORNEYS Feb. 13, 1934.   W. J. WARD ET AL   1,947,142
INSPECTION APPARATUS
Filed Aug. 22, 1933   5 Sheets-Sheet 5
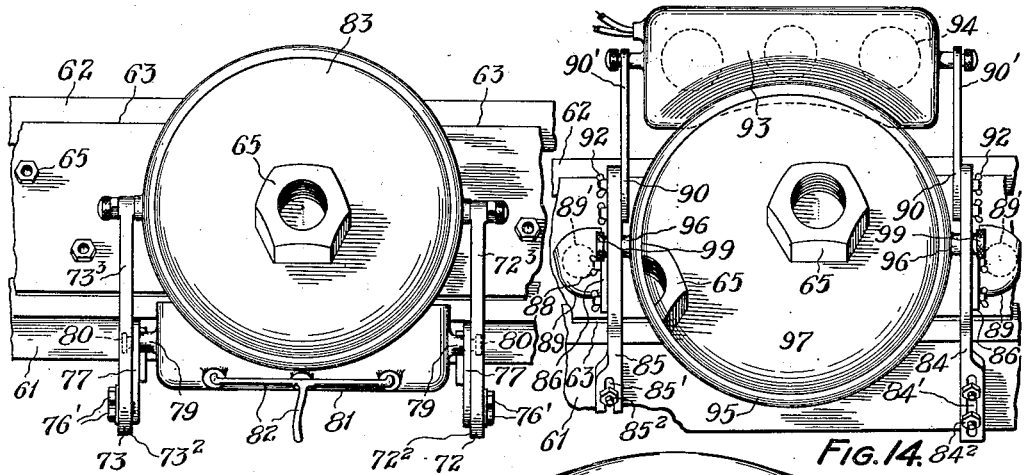
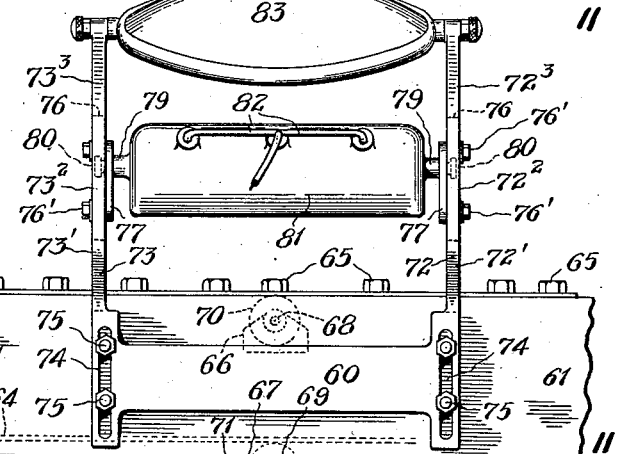
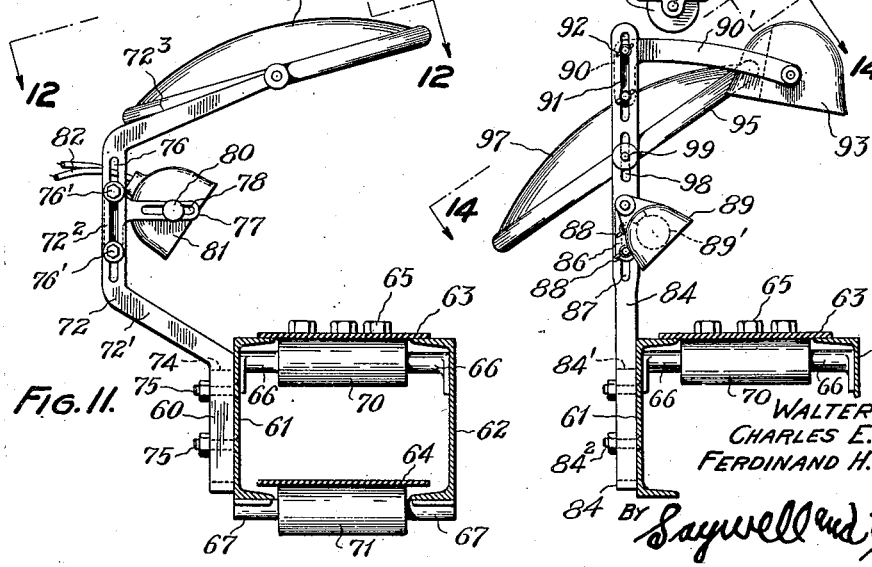
INVENTORS:
WALTER J. WARD
CHARLES E. BAUERLE
FERDINAND H. DALRYMPLE
BY Saywell and Wessler
ATTORNEYS Patented Feb. 13, 1934

1,947,142

UNITED STATES PATENT OFFICE 1,947,142

INSPECTION APPARATUS

Walter J. Ward, Lakewood, Charles E. Bauerle, Cleveland, and Ferdinand H. Dalrymple, Bedford, Ohio Application August 22, 1933. Serial No. 686,256

7 Claims. (Cl. 88—14)

Our invention is particularly adapted for the inspection of bottles and other containers for beer, ale, wine, soft drinks, milk, food, chemicals, etc., both when the containers are filled and when empty, the inspection being for the purpose of disclosing chips, fractures, and other defects in the containers, also leaky containers, and the presence of dirt, slime, bristles, insects, and other foreign substances, as well as haze or other untoward conditions of the liquids contained in the containers. The invention permits satisfactory inspection of flint or clear bottles, as well as amber, green, and other colored containers. The invention also lends itself for use in other industries, such as the inspection of battery grids, bolts, nuts, beans and eggs on grading tables, etc. An important advantage of the invention, in addition to the fact that it provides convenient and efficient inspection, is that it may be used by the operator for reasonably long periods, such as a full day's work, without eye strain. The invention will be illustrated in this application by detailed reference to its use as apparatus for inspecting bottles.

The annexed drawings and the following description set forth in detail certain means embodying our invention, such means disclosing, however, but a few of the various forms in which the principle of the invention may be applied.

In said annexed drawings:

Figure 1 is a front elevation of the preferred form of our inspection apparatus, the same being particularly adaptable for the inspection of filled bottles;

Figure 2 is a fragmentary front elevation of a modification which includes a different form of guide rails for the bottles as they are moved by a conveyor through the field of inspection and transversely of the operator's line of vision;

Figure 3 is a side elevation of the apparatus shown in Figure 1, partially in section on the center line of Figure 1;

Figure 6 is a front elevation of a modified form of the invention, the use thereof being illustrated by the inspection of eggs;

Figure 7 is a vertical section, taken in the plane indicated by the line 7—7, Figure 6, certain parts being shown in elevation;

Figure 8 is a plan view of the apparatus shown in Figure 6;

Figure 9 is a fragmentary vertical section, illustrating a modified form of belt conveyor;

Figure 10 is a front elevation of another modified form of the invention, the use of the same being illustrated by the inspection of nuts;

Figure 11 is a side view of the apparatus shown in Figure 10, taken from the plane indicated by the line 11—11, Figure 10;

Figure 12 is an oblique plan view of said apparatus, taken from the planes indicated by the line 12—12, Figure 11;

Figure 13 is a fragmentary side view of a form of apparatus somewhat modified in structure from that form shown in Figures 10, 11 and 12; and Figure 14 is an oblique plan view of the apparatus shown in Figure 13, taken from the planes indicated by the line 14—14, Figure 13.

Figure 5:
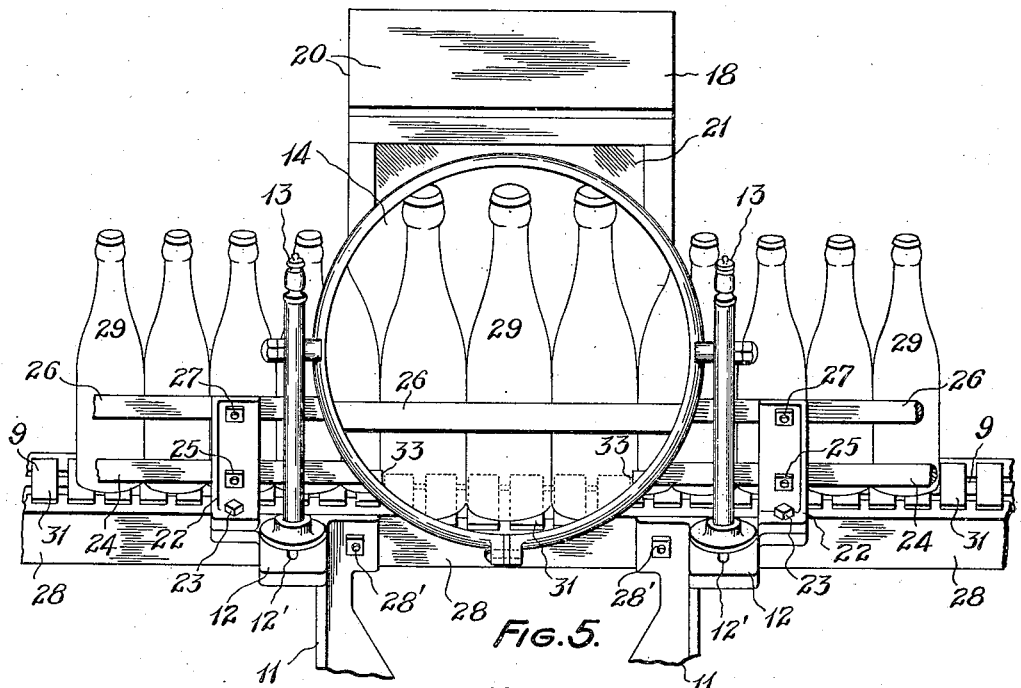
Figure 5 is an elevation, as seen from the line 5—5, Figure 3, and shows the view of the inspected articles obtained by the operator.
Figure 4:
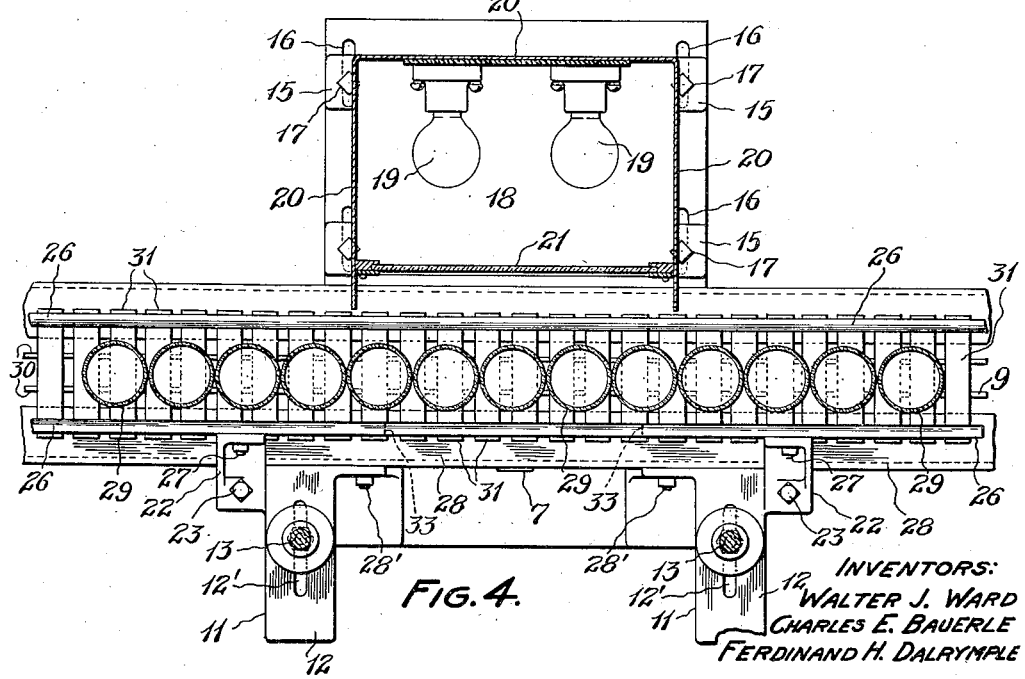
Figure 4 is a plan section, taken in the planes indicated by the line 4—4, Figure 3.

Referring to the annexed drawings in which the same parts are designated by the same respective numbers in the several views, and particularly first referring to Figures 1 to 5, inclusive, a tubular base support 1 telescopically receives a cylindrical column 2 which is vertically adjustable by a set screw 4 which intersects a collar 3 surrounding the column 2 and having a depending flange 3' surrounding the tubular base 1 and to which it is rigidly fastened by means of a set screw 4'. Mounted upon the top of the column 2 is a platform 5 to which is fastened a yoke 6 having upwardly-extended opposed side plates 7 between which is rotatably mounted a roller 8 over which passes the lower run 10 of an endless conveyor 9. Also secured to the platform 5, adjacent the front edge of the latter and upon opposite sides of the yoke 6, are a pair of upwardly-extended braces 11 forming supports for certain parts of the inspection apparatus as hereinafter fully described.

The supporting braces 11 are of angular formation and upon horizontal extensions 12 thereof are mounted vertical posts 13 which are adjustable transversely of the direction of travel of the belt 9 by means of elongated slots 12' formed in the extensions 12 and through which the posts 13 extend. The posts 13 form supporting standards for a magnifying lens 14 which is pivotally supported therein so that the lens 14 can be adjusted to make the field of vision therethrough concide with a part of the belt 9 and the space vertically adjacent thereto. I refer to this belt portion and space, in the claims appended hereto, as "an upper portion of the pathway of the conveyor and the space adjacently beneath said pathway portion."

Upon the rear part of the platform 5 are mounted two pairs of vertically-extended braces 15 which support a cabinet 18 having rear, side, top, and bottom metal walls 20, and a front wall 21 of light diffusing material such as opalescent glass. It will be clearly evident from Figure 3 that the belt 9 travels substantially centrally of the described assembly and that the lens 14 and the light cabinet 18 are disposed in opposed relation upon opposite sides of the belt 9. Thus, articles to be inspected, such as the bottles 29, when placed upon the belt 9 successively come into the field of vision through the lens 14 where they are magnified and can be subjected to inspection while illuminated by light reflected from the metal walls 20 of the cabinet 18. Such light is furnished by a plurality of standard light bulbs 19 mounted in the cabinet 18, the light from which is reflected from the walls 20 and diffused by the opalescent front 21 of the cabinet. Preferably we mount the lamps 19 in a bakelite base secured to the inner face of the rear wall 20 of the cabinet 18. The cabinet 18 is adjustable toward and from the belt 9 by means of transverse elongated slots 16 formed in the platform 5 and through which pass bolts 17 which serve to secure the supporting braces 15 to the platform 5.

Also mounted upon the angular braces 11 by means of bolts 23 and upon opposite sides of the belt 9 are spaced opposed pairs of vertically-extended angular clips 22 forming support posts for respective lower and upper pairs of guide rails 24 and 26 which form means for positioning and guiding the bottles 29 conveyed by the belt 9. The lower rails 24 are secured to the support posts 22 by bolts 25 and the upper rails are so secured by bolts 27.

Also secured to the support brackets 11 by means of bolts 28' are a pair of angular tracks 28 upon the opposed horizontal extensions of which travel the upper run of the belt 9, this belt comprising two opposed series of articulated links 30 spanned and connected by spaced slats 31.

It is particularly desirable in the inspection of filled bottles that the bottom thereof be subject to thorough and fault-proof inspection. We provide several expedients for effecting this purpose. In the first place, the lens 14 can be so tilted, as shown in Figure 3, to bring the bottom of the bottles most clearly into the line of vision, so that the operator's view is that illustrated in Figure 5; and, furthermore, we remove a portion of one flange of the angle 28 upon the light-cabinet side of the apparatus, as illustrated by "32", Figure 3, so that light is reflected directly upon the bottom of the bottles 29, the spaced slat formation of the belt 9 permitting the light to come through from beneath the belt 9; and, still further, we remove substantially that portion of the lower guide rails 24 which is within the field of vision, such as illustrated by "33", Figure 1, thus eliminating any obstruction to a clear view of the bottom of the bottles which would be caused by these lower rails 24.

In the modification shown in Figure 2, we use solid guide rails 34, instead of the spaced upper and lower rails 24 and 26, shown in Figure 1. In using this modified form of guide rail, we remove a substantial portion of the lower part thereof within the field of vision, as illustrated by "35", Figure 2, in order to properly inspect the lower part of the bottles 29.

In the form of invention shown in Figures 6, 7 and 8, a support 36 of yoke-shape formation is mounted upon the column 2 and has upwardly-extended spaced supporting posts 37 each formed with three vertically-extended elongated slots 38, 39 and 40. Secured to the inner faces of the supporting posts 37 by means of bolts 43 extended through the slots 38 and 39 and hence vertically adjustable is a light cabinet 41 having metal sides and bottom 42 and an opalescent top 44. Also mounted in the supporting posts 37 and adjacent the upper ends thereof and pivotally secured by means of pins 46 intersecting the slots 40, and hence vertically adjustable, is a lens 47. Also mounted in the supporting posts 37 and adjacent the lower ends thereof by means of pins 48 is a rotatable roller 49 over the top surface of which passes the lower run 51 of an endless belt 50. The upper run of the belt 50 upon which are conveyed the articles to be inspected, in this instance, eggs 56, passes adjacently beneath opposed side guides 57 and over two opposed pairs of rollers 52 mounted in brackets 53 by means of pins 54, the brackets 53 being secured to the outside faces of the sides of the light cabinet 41. The endless conveyor 50, in this form of device, is of screen formation, so that the light from the lamps 55 contained in the cabinet 41 is made available for inspection of the eggs 56 through the magnifying lens 47, as is clearly shown in Figure 8.

In the modification shown in Figure 9, the same assembly is utilized as herein described with relation to Figures 6, 7 and 8, with the exception that the belt 58 is formed of suitable opaque fabric, leather or rubber, and provided with spaced holes 59 forming seats for the eggs to be inspected, and hence permitting the use of the light from the lamps 55 beneath the belt 58.

In the form of invention shown in Figures 10, 11 and 12, a support 60 of yoke formation is formed with the two upwardly-extended supporting posts 72 and 73, and is secured to and supported by a longitudinal channel member 61 within which the yoke support is vertically adjustable by means of elongated slots 74 formed in the yoke 60 and clamping nuts 75. Between the channel 61 and a companion opposed channel 62 are mounted upper and lower rollers 70 and 71, respectively, over which pass respectively the upper and lower runs 63 and 64 of an endless conveyor upon which the articles to be inspected are passed through the field of the inspection apparatus, such articles being, in the form of apparatus illustrated, nuts 65. The upper roller 70 is mounted on a bracket 66 having bearings for the roller trunnions 68, and the lower roller 71 is mounted on a bracket 67 having bearings for the trunnions 69. Both of the brackets 66 and 67 are fastened to the opposed channels 61 and 62.

The supporting posts 72 and 73 of the yoke member 60 are of angular formation having upper and lower laterally bent sections $72^3$, $72^1$, $73^3$ and $73^1$, respectively, and respective intermediate upwardly-extended connecting sections $72^2$ and $73^2$. Between the laterally-extended yoke sections and upon the upwardly-extended sections are mounted brackets 77 having elongated slots 78 within which are pivotally mounted trunnions 79 of a reflector 81, which is adjustable transversely of the direction of travel of the belt 63 through the medium of the elongated slots 78 formed in the brackets 77 and the clamping bolts 80. The supporting brackets 77 of the reflector 81 are vertically adjustable upon the yoke 60 by means of the elongated slots 76 formed in the sections $72^2$ and $73^2$, the brackets 77 being held to their adjusted position by means of the clamping bolts 76'. Within the reflector frame 81 are mounted suitable lamps, as suggested by the conductors 82, for throwing light upon the nuts 65 within a certain area of the belt run 63.

The upper laterally-extended sections 72³ and 73³ of the yoke 60 form supports for the frame of a magnifying lens 83 which is pivotally mounted in said sections 72³ and 73³ and which, due to the laterally-extended inward formation of the yoke sections 72³ and 73³, is located substantially vertically above the field of the belt run 63 which it is desired to inspect.

In Figure 12 is clearly shown the appearance and position of the nuts 65 being inspected, from the operator's viewpoint, when the lamps and reflector and magnifying lens are adjusted to the relative positions shown in Figure 11.

In the form of invention shown in Figures 13 and 14, we provide upwardly-extended supporting posts 84 and 85 which are vertically adjustably supported by a longitudinal channel 61 through the medium of elongated slots 84', 85' formed in the posts 84 and 85, respectively, and the clamping bolts 84², 85², respectively. The form of apparatus shown in Figures 13 and 14 is quite similar to that shown in Figures 10, 11 and 12, except that the supporting posts in the apparatus of Figures 13 and 14 are not of angular formation, and the main reflector is positioned substantially vertically above the articles being inspected instead of laterally thereof, as is true of the apparatus shown in Figures 10, 11 and 12; also, the magnifying lens is positioned somewhat laterally of the articles being inspected, instead of substantially in vertical alignment with said articles, as shown in Figures 10, 11 and 12. Furthermore, the apparatus of Figures 13 and 14 is equipped with comparatively small side lights which are supported by the posts 84 and 85 and are both vertically and pivotally adjustable. As is true of the form of apparatus shown in Figures 10, 11 and 12, the apparatus of Figures 13 and 14 is provided with a companion opposed channel 62, upon which and the opposite channel 61 are mounted upper and lower rollers over which respectively pass the upper and lower runs of an endless conveyor upon which the nuts to be inspected are passed through the field of the inspection apparatus, only the upper roller 70 being shown in the drawings and only the upper run 63 of the conveyor.

Referring particularly to the detailed construction and mounting of the reflectors and lens of the apparatus shown in Figures 13 and 14, two brackets 86 are vertically adjustably supported upon the posts 84 and 85 through the medium of elongated slots 87 formed in said posts and clamping bolts 88, these brackets 86 forming supports for lamp reflectors 89 pivotally mounted therein. The reflectors 89 and the lamps associated therewith are comparatively small and serve as auxiliaries to a larger reflector and lamps, hereinafter mentioned, which are disposed substantially in vertical alignment with the nuts 65. The said larger reflector 93 within which is housed suitable lamps 94 is supported upon transversely-extending arms 90' of two brackets 90 which are vertically adjustably supported by the posts 84 and 85 through the medium of elongated slots 91 formed in said posts and clamping bolts 92. The reflector 93 is pivotally mounted in and adjacent the free ends of the arms 90', and these arms are of such a length as to position the reflector 93 in substantially vertical alignment with the nuts 65 within the field of vision through a magnifying lens 97. This lens 97 is supported by the posts 84 and 85 above and laterally of the nuts 65, and is vertically adjustable through the medium of elongated slots 98 formed in the said posts and adapted to receive trunnion members 96 formed upon the frame 95 of the reflector 97 and permitting pivotal adjustment of the reflector 97. The desired adjusted position of the reflector 97 is maintained by the clamping bolts 99.

The different relative positions of the lamps, reflectors, and lenses, in the form of apparatus shown in Figures 10, 11 and 12, as compared with the relative positions of these elements in the apparatus shown in Figures 13 and 14, provide satisfactory inspection for a large variety of conditions, in some of which, one arrangement is preferable, and in some of which other arrangements are preferable, since under some conditions the apparatus of Figures 10, 11 and 12 will induce a glare or shadows which prevent perfect inspection; whereas, the production of such glare or shadows by the use of the apparatus shown in Figures 13 and 14 is obviated. Under other conditions, the relative arrangement of parts shown in Figures 10, 11 and 12 is preferable.

What we claim is:

1. Inspection apparatus comprising a support, a perforated conveyor movable relatively thereto, means forming upwardly-extending guide rails adjacent to and along the opposite sides of the pathway of the conveyor, a light cabinet mounted upon the support adjacent the pathway of the conveyor and having light-reflecting walls, means for diffusing light from the cabinet upon an upper portion of the pathway of the conveyor and into the space adjacently beneath said pathway portion, and a magnifying lens mounted upon the support and having its field within the diffused light area.

2. Inspection apparatus comprising a support having two portions thereof located respectively upon opposite sides of the inspection area, a perforated conveyor movable through the space between said two support portions, a light cabinet mounted upon one of said support portions adjacent the pathway of the conveyor and having light-reflecting walls, means for diffusing light from the cabinet upon an upper portion of the pathway of the conveyor and into the space adjacently beneath said pathway portion, and a magnifying lens mounted upon the other support portion and having its field within the diffused light area.

3. Inspection apparatus comprising a support, a conveyor movable relatively thereto, means forming upwardly-extended guide rails adjacent to and along the opposite sides of the pathway of the conveyor, a light cabinet mounted upon the support laterally adjacent one side of the pathway of the conveyor, a magnifying lens having its field within a portion of the pathway of the conveyor, and means for distributing the light from the cabinet upon said field, said guide rails being broken away adjacent said field.

4. Inspection apparatus comprising a support having opposed upwardly-extended guide members, an endless conveyor having its upper run intermediate of the lower portions of said guide members, a light cabinet mounted upon the support adjacent the pathway of the conveyor and having light-reflecting walls, means for diffusing light from the cabinet upon an upper portion of the pathway of the conveyor, and a magnifying lens mounted upon the support and upon the side of the conveyor opposite that upon which the cabinet is mounted, said lens having its field within the diffused light area, portions of said guide members being cut away immediately in front of said lens and said cabinet.

5. Inspection apparatus comprising a support having opposed pairs of spaced upper and lower guide rails, an endless conveyor having its upper run intermediate of and adjacent to the lower guide rails, a light cabinet mounted upon the support laterally adjacent one side of the pathway of the conveyor and having light-reflecting walls, means for diffusing light from the cabinet on an upper portion of the pathway of the conveyor through the space between the upper and lower guide rails upon one side of the conveyor, and a magnifying lens mounted upon the support and upon the side of the conveyor opposite that upon which the cabinet is mounted, said lens having its field within the diffused light area.

6. Inspection apparatus comprising a support, an endless conveyor movable relatively thereto and comprising laterally-spaced articulated side members and longitudinally-spaced connecting cross slats, a magnifying lens mounted on the support and having the line of vision therethrough intersecting an upper portion of one run of the conveyor, a light cabinet mounted upon the support, and means for distributing light from the cabinet upon the field of said lens, the light cabinet extending below said portion of the conveyor run, and the light-distributing means also functioning upwardly between the slats of the conveyor.

7. Inspection apparatus comprising a support having opposed pairs of spaced upper and lower guide rails, an endless conveyor having its upper run intermediate of and adjacent to the lower guide rails, a light cabinet adjustably mounted upon the support and extending downwardly below the upper run of the conveyor, means for diffusing light from the cabinet on an upper portion of the pathway of the conveyor through the space between the upper and lower guide rails upon one side of the conveyor, angles secured to said support and having horizontal leg portions upon which the upper run of the conveyor travels, said angles having downwardly-extended leg portions of which the one adjacent the light cabinet is broken away, and a magnifying lens adjustably mounted upon the support and having its field within the diffused light area.

WALTER J. WARD.
CHARLES E. BAUERLE.
FERDINAND H. DALRYMPLE.